(12) United States Patent
Moore et al.

(10) Patent No.: US 8,713,683 B2
(45) Date of Patent: Apr. 29, 2014

(54) SECURITY ARRANGEMENTS FOR EXTENDED USB PROTOCOL STACK OF A USB HOST SYSTEM

(75) Inventors: Terrill M. Moore, Trumansburg, NY (US); John I. Garney, Portland, OR (US); Salvatore Gregory Scaffidi, Jr., Leander, TX (US); Christopher Jay Yokum, San Diego, CA (US)

(73) Assignee: MCCI Corporation, Ithaca, NY (US)

( * ) Notice: Subject to any disclaimer, the term of this patent is extended or adjusted under 35 U.S.C. 154(b) by 0 days.

(21) Appl. No.: 13/637,075

(22) PCT Filed: Jan. 31, 2012

(86) PCT No.: PCT/US2012/000049
§ 371 (c)(1), (2), (4) Date: Sep. 25, 2012

(87) PCT Pub. No.: WO2012/106049
PCT Pub. Date: Aug. 9, 2012

(65) Prior Publication Data
US 2013/0014221 A1    Jan. 10, 2013

Related U.S. Application Data

(60) Provisional application No. 61/438,398, filed on Feb. 1, 2011.

(51) Int. Cl.
*H04L 29/06* (2006.01)
*G06F 21/85* (2013.01)
*G06F 21/57* (2013.01)

(52) U.S. Cl.
CPC ............... *G06F 21/85* (2013.01); *G06F 21/57* (2013.01)
USPC .......................................... 726/25; 713/187

(58) Field of Classification Search
CPC ......... G06F 21/85; G06F 21/70; G06F 21/71; G06F 21/73; G06F 21/82; G06F 21/83; G06F 21/50; G06F 21/55; G06F 21/57
USPC .......................................................... 726/25
See application file for complete search history.

(56) References Cited

U.S. PATENT DOCUMENTS

2005/0086530 A1\* 4/2005 Goddard ...................... 713/201
2006/0143716 A1\* 6/2006 Ikemoto ........................ 726/27

(Continued)

FOREIGN PATENT DOCUMENTS

EP    2136310 A1    12/2009

OTHER PUBLICATIONS

The International Search Report and the Written Opinion of the International Searching Authority for International Application No. PCT/US2012/000049 filed on Jan. 31, 2012 by MCCI Corporation, mail date Apr. 10, 2012, 9 pages.

(Continued)

*Primary Examiner* — Yogesh Paliwal
(74) *Attorney, Agent, or Firm* — Cesari and McKenna, LLP (57) ABSTRACT

Security arrangements for a universal serial bus (USB) protocol stack of a USB host system are provided. The security arrangements prevent an unauthorized or suspicious USB device from communicating with the host system, detect suspicious activity originating from a device which is already communicating with the host system and may provide notification to a user.

18 Claims, 3 Drawing Sheets

(56) References Cited

U.S. PATENT DOCUMENTS

| | | | |
|---|---|---|---|
| 2006/0218320 A1* | 9/2006 | Avraham et al. | 710/62 |
| 2008/0022360 A1* | 1/2008 | Bacastow | 726/1 |
| 2009/0006686 A1* | 1/2009 | Kimura | 710/106 |
| 2010/0131709 A1* | 5/2010 | Yoshida | 711/115 |
| 2011/0061112 A1* | 3/2011 | Berengoltz et al. | 726/30 |
| 2011/0214157 A1* | 9/2011 | Korsunsky et al. | 726/1 |

OTHER PUBLICATIONS

"Plug and Prey: Malicious USB Devices" by Adrian Crenshaw, presented at Shmoocon 2011, 41 pages.

* cited by examiner

SECURITY ARRANGEMENTS FOR EXTENDED USB PROTOCOL STACK OF A USB HOST SYSTEM

The present application claims priority from a PCT application and a provisional application and International application of common title, inventorship and ownership. This application is a section 371 application which claims priority to PCT/US2012/000049, filed Jan. 31, 2012, and U.S. provisional application Ser. No. 61/438,398, filed Feb. 1, 2011, both of which are incorporated by reference.

BACKGROUND

1. Technical Field

The present disclosure relates generally to universal serial bus (USB) host systems and, more specifically, to security arrangements for an extended USB protocol stack of a USB host system.

2. Background Information

Over the past 15 years, USB has emerged as the preferred, if not dominant, is technology for interfacing personal computers (PCs) or other host systems with a wide variety of devices including mass storage, smartphones, digital cameras, media players, keyboards and the like. Users enjoy the convenience and simplicity of USB, while manufacturers and software developers enjoy the benefits of having a single standard interface to support, although there are several different USB specifications that include different speeds.

While the USB protocol has proved sufficiently robust for typical user data transfers over short distances, the protocol does not include any security features to prevent or limit the effects of malicious activity originating from a USB device. For example, the USB protocol for wired communication does not require authentication of a USB device before permitting communication between the device and a host system. Thus, if a wired USB device identifies itself to a host system and the host has the appropriate driver available for that device, communication is established and the USB device is simply presumed to be non-malicious. Consequently, an unauthorized or malicious user could gain access to, disable or otherwise interfere with a host system by programming a USB device to launch an attack, deliver a virus, download data from the host system and the like.

SUMMARY OF THE INVENTION

In brief summary, the present invention provides security arrangements which prevent a suspicious or unauthorized USB device from communicating with a host system, or prevents continued communications between a USB device and the host system where suspicious activity is detected originating from a USB device. User involvement in the security arrangements may be permitted or not as desired. For example, a user may be given a visual warning of the presence of a suspicious USB device along with the option to permit or deny communication between that device and the host system. Alternatively, a suspicious USB device may be denied communication with the host system without user involvement.

In accordance with a first embodiment of the invention, security arrangements are provided through an extension of the USB protocol stack, e.g., through the addition of a security control module (SCM) to the stack. In accordance with a second embodiment of the invention, security arrangements are provided through a host controller. The first and second embodiments may be combined such that the USB protocol stack and host controller cooperate to provide the desired security arrangements. In accordance with yet another embodiment of the invention, at least part of the security arrangements are provided in connection with the host system's BIOS functions. To meet the requirements of a particular application or environment, various embodiments of the invention may be implemented in either hardware or software or a combination of both.

In accordance with various embodiments of the invention, a variety of security techniques may be applied either individually or in combination. First, a security control application interface (SCAI), which interfaces with the SCM, may be used to examine a new USB device when it is initially connected to the host system and prior to allowing communication between the device and the host's operating system. In determining whether to allow such communication, the SCAI may examine a variety of information from the USB device, including its device, configuration, interface and string descriptors, looking for suspicious patterns. Similarly, the SCAI may look for suspicious combinations of functions associated with the USB device. The SCAI may also include an application programming interface through which anti-virus applications, firewall applications or other applications may examine or test the USB device or provide further information to be used in the determining whether to allow the device to communicate with the host's operating system. The SCAI may also provide a user configuration interface through which a user may direct various actions including selecting or changing a desired security level, identifying in advance pre-approved or disapproved USB devices, and the like.

The SCAI may also interface with a device identification database or other data is structure which may be used to maintain a whitelist of approved USB devices, a blacklist of prohibited USB devices, or a combination of both. When a new USB device is initially connected to the host system, the SCAI may retrieve specific information about the device (e.g., its manufacturer ID, product ID or other information) and compare such information to the whitelist and/or blacklist to determine if the USB device is clear to communicate with the host system. The contents of the device identification database may be updated in the field by any of a variety of techniques including host-initiated, automatic communication with a designated website, remote access to the host system by an authorized service provider, and user-initiated action.

In addition, a run-time device identification module (DIM) may be provided and interfaced with the SCM, device identification database and additional modules which perform static analysis or heuristic analysis on activity originating from USB devices. Based on the results of static or heuristic analysis (or both), the DIM may output a dynamic indication of whether a particular USB device is operating as expected or in a suspicious manner. Such indication is provided to an admission control module (ACM) which may determine when suspicious activity rises to the level that action is warranted. The ACM communicates with a threat notification module which may provide a visual, message-based or other notification to a user of the perceived threat and request the user to take appropriate action which could include manually approving or disapproving a particular USB device. In addition, the ACM may, without user involvement, block a USB device from communicating with or further communicating with the host system based on an observed violation of security policy.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1:
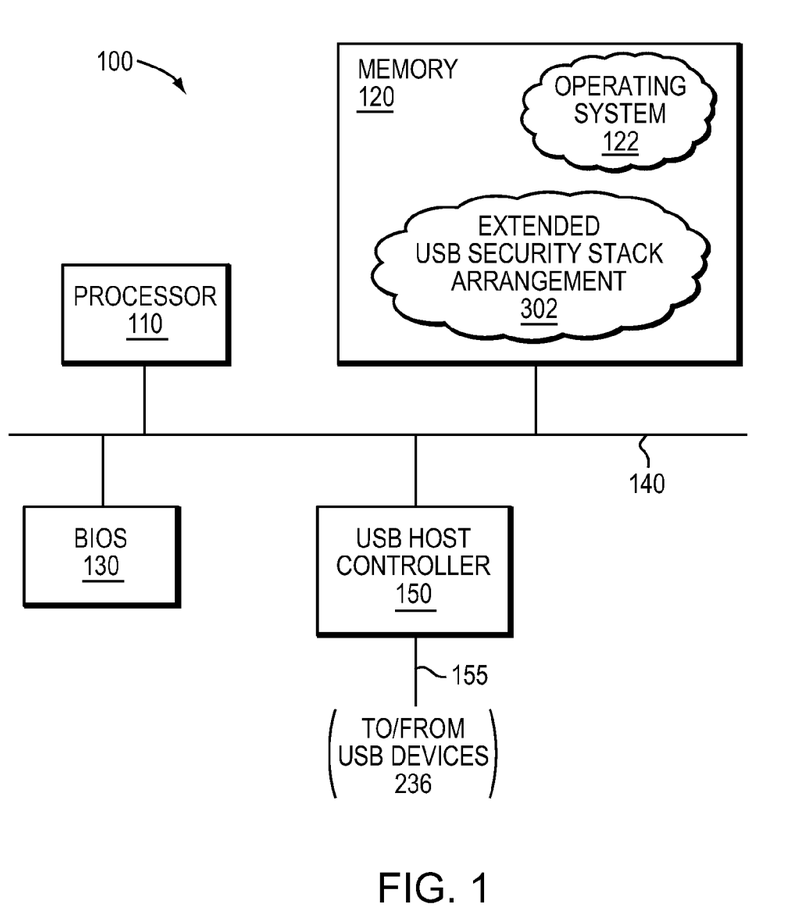
FIG. 1 is a block diagram of a USB host system.

FIG. 1 shows a block diagram of a conventional USB host system 100 which may, for example, represent a personal computer (PC). The USB host system 100 illustratively includes a processor 110, memory 120, a Basic Input/Output System (BIOS) 130 and a USB host controller 150 interconnected by a system bus 140. The BIOS 130 provides a firmware interface that performs various testing and initialization functions (such as, e.g., power-on self test, identification and initialization of system devices) prior to executing boot loader software needed to bootstrap or "boot" the system 100. The USB host controller 150 contains the mechanical, electrical and signaling circuitry needed to connect the host system 100 to USB devices 236 coupled to a USB bus 155. To that end, the USB host controller 150 provides a hardware interface for the USB devices 236, which may include a keyboard, mouse, mass storage, digital camera as well as many other types of devices.

The memory 120 may include a plurality of locations that are addressable by processor 110, BIOS 130 and/or USB host controller 150 for storing software programs and data structures associated with the embodiments described herein. The processor 110 may include logic adapted to execute the software programs and manipulate (i.e., control) the data structures, such as a device identification database described herein. An exemplary processor 110 may include single or multi-core Central Processing Unit (CPU), Graphics Processing Unit (GPU), Field Programmable Gate Array (FPGA) and/or Application Specific Integrated Circuit (ASIC).

An operating system 122, portions of which are typically resident in memory 120 and executed by the processor 110, functionally organizes the host system 100 by, inter alia, invoking operations in support of software processes and/or applications executing on the host system. The operating system 122 is illustratively organized as a series of software layers including protocol stacks organized as file system, network and/or direct input stacks, as described herein. A suitable operating system 122 may include the Windows® series of operating systems from Microsoft Corp. of Redmond, Wash., the Linux® operating system, the MAC OS® series of operating systems from Apple Inc. of Cupertino, Calif., and the UNIX® series of operating system, among others. The software processes/applications may include various processes/applications of an extended USB protocol stack security arrangement 302 and, as such, contain computer executable instructions executed by processor 110 of host system 100 to perform functions described herein.

It will be apparent to those skilled in the art that other types of processors and memory, including various tangible non-transitory computer-readable media, may be used to store and execute program instructions pertaining to the system described herein. Also, while the embodiments herein are described in terms of software processes/applications stored in memory, alternative embodiments also include those processes/applications being embodied as modules consisting of hardware, software, firmware, or combinations thereof.

Figure 2:
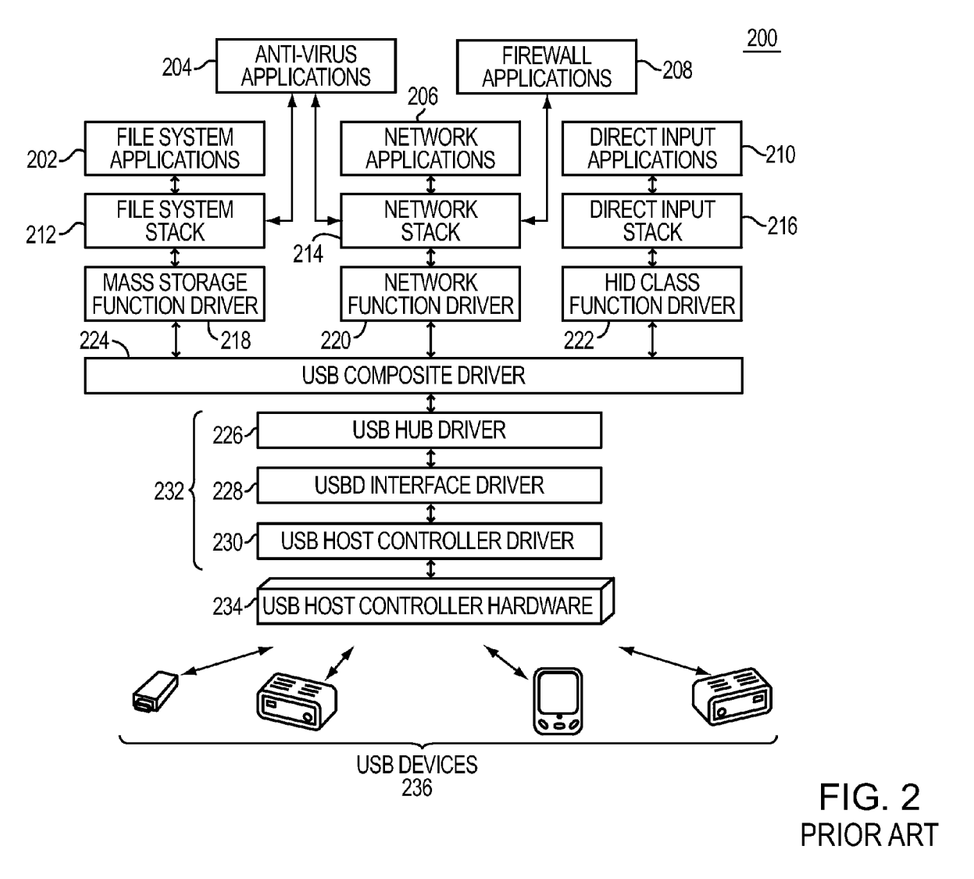
FIG. 2 is a block diagram of a conventional USB protocol stack.

FIG. 2 is a block diagram of a USB host system 200 with a conventional USB protocol stack 232. File system applications 202 may include directory and file browsers provided by the operating system and other suppliers (e.g., "Explorer" from Microsoft Corp. and "Finder" from Apple Inc.). Antivirus applications 204 may include software available from Symantec, McAfee and other suppliers. Network applications 206 may include web browsers available from Microsoft Corp. and other suppliers. Firewall applications 208 may include software available from Kaspersky, Online Armor and other suppliers. Direct input applications 210 may include word processing and spreadsheet applications available from Microsoft and other suppliers.

A file system stack 212, examples of which are NTFS and FAT32, may form part of the operating system 122 of host system 200 and enables communication between file is system applications 202 and a mass storage function driver 218. Similarly, a network stack 214 may form part of the operating system and supports various network protocols such as TCP/IP, HTTP and others, thus enabling communication between network applications 206 and a network function driver 220. A direct input stack 216 which may also form part of the operating system supports direct user input (e.g., keyboard strokes or mouse clicks) and enables communication between direct input applications 210 and human interface device (HID) class function drivers 222.

Drivers 218, 220 and 222 communicate with a USB composite driver 224. In turn, USB composite driver 224 communicates with a USB stack 232 which enables communication between composite driver 224 and USB host controller (hardware) 234. USB stack 232 includes a USB hub driver 226, USBD interface driver 228 and USB host controller driver 230.

Figure 3:
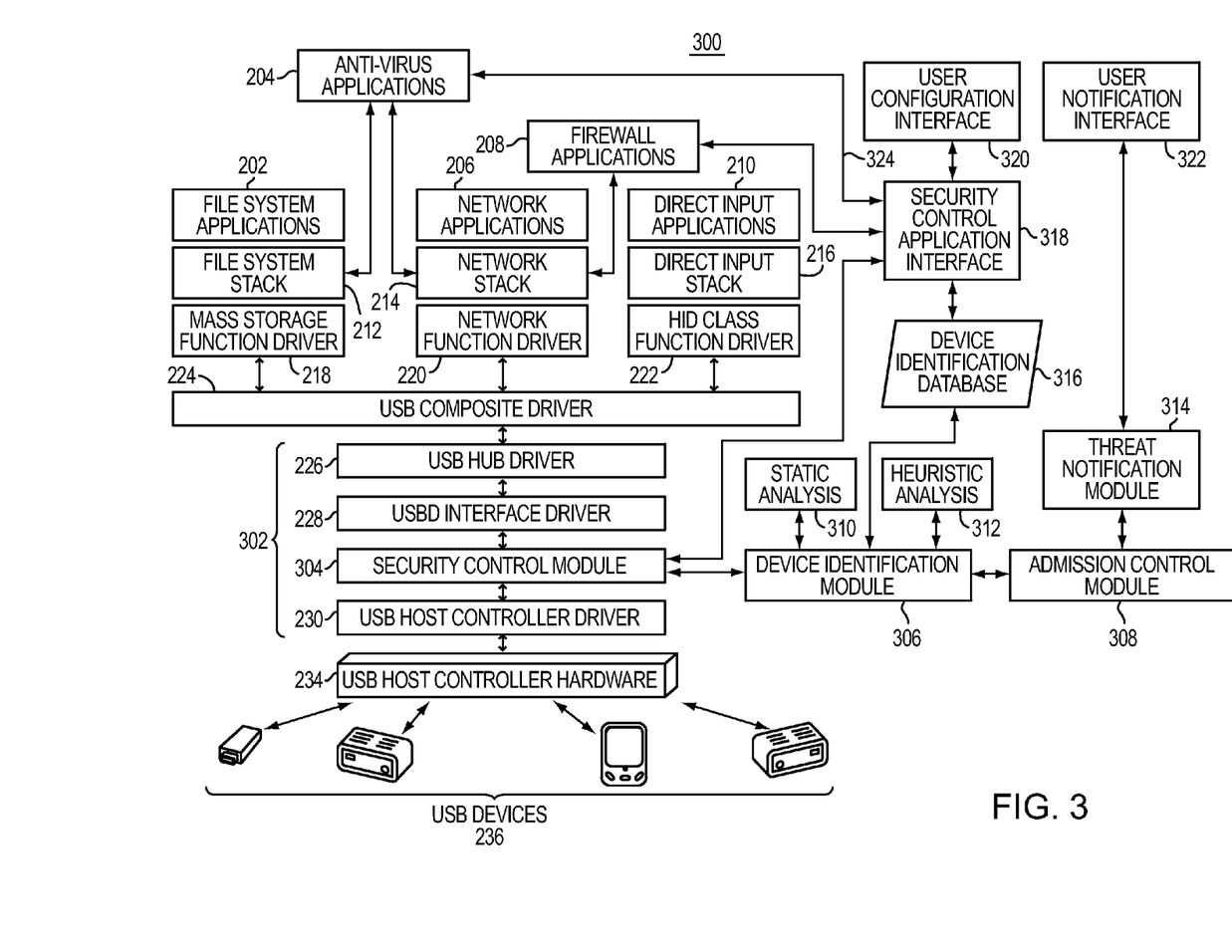
FIG. 3 is a block diagram of an extended USB protocol stack, which includes security arrangements in accordance with embodiments of the present invention.

FIG. 3 shows a block diagram of a USB host system 300 which includes an extended USB protocol stack 302 and which embodies USB security arrangements in accordance with at least one embodiment of the present invention. For clarity and brevity, functional blocks shown in FIG. 3 which were previously described are identified by their prior reference numbers.

The extended USB stack 302 includes a security control module (SCM) 304. SCM 304 is preferably disposed between USBD interface driver 228 and USB host controller driver 230 and thus enables (or disables) communication between those drivers. SCM 304 is interfaced with a run-time device identification module (DIM) 306 and a security control application interface (SCAI) module 318. DIM 306 is interfaced with static analysis functions 310, heuristic analysis functions 312 and an admission control module (ACM) 308. A threat notification module 314 is interfaced with ACM 308 and a user notification interface module 322. A device identification database (DID) 316 is interfaced with both DIM 306 and SCAI 318. A user configuration interface module 320 is also interfaced with SCAI 318.

In an illustrative embodiment, the software processes and/or modules, including is the drivers and functions, described herein may be implemented as separately-scheduled processes within the USB host system 300; however, in an alternate embodiment, the modules may be implemented as pieces of code within a single process. Communication between modules of the host system 300 may thus illustratively be effected through the use of message passing, shared memory or remote procedure calls (RPCs) between the modules. A suitable message-passing, shared memory and/or RPC mechanism provided by the operating system 122 to transfer information between modules (processes) is the Inter Process Communication (IPC) mechanism.

The functions of the SCM, SCAI, DIM and ACM may be distributed among various combinations of the host system, the host system's BIOS and the USB protocol stack. For example in USB host system illustrated in FIG. 2, when a new USB device is connected to the host controller 234, the host system 200 detects the new device (usually by monitoring a USB data line) and sends a packet (or packets) of information to the new USB device and receives packets from the device. This initial exchange of packets does not represent the data transfers that will occur in the typical operation of a USB device. Rather, this initial exchange of packets allows the host system to select the correct driver for the new USB device. At some time during this initialization, the criteria used by the SCM and SCAI to detect unauthorized USB devices may be applied such that the host system may prevent further communications when a suspicious or unauthorized USB device is detected. In practice, the functions and criteria necessary to implement a desired security arrangement may be distributed in various ways among the host system, its I/O system and the SCM/SCAI modules shown in FIG. 3.

A similar distribution of functions may be implemented among the host system, its BIOS, and the SCM, DIM and ACM modules for run time suspicious activity as described below with respect to the DIM and ACM module functions.

The operation of the security arrangements (e.g., modules and/or functions) shown in FIG. 3 will now be described. At a high level, SCM 304, in response to input received from either SCAI 318 or DIM 306 (or both) functions to either enable or disable communication between a given USB device 236 and the remainder of USB host system 300. More specifically, if a given USB device 236 is identified as blacklisted or suspicious, as described in detail below, SCM 304 cooperates with the SCAI 318 and/or DIM 306 to block communication between USB host controller driver 230 and USBD interface driver 228 with respect to that USB device. Conversely, if a given USB device 236 is identified as whitelisted (cleared) or not suspicious, SCM 304 permits communication between USB host controller driver 230 and USBD interface driver 228 with respect to that USB device.

When a new USB device 236 is first connected to USB host controller hardware 234 and prior to allowing any communication between that device and the remainder of host system 300, SCM 304 reports the presence of the new USB device to SCAI 318 and run-time DIM 306. In response, SCAI 318 may request information regarding the new USB device, including its device, configuration (interface) and string descriptors, and possibly other information such as the device's functions. Within such information, SCAI 318 looks for suspicious patterns such as mismatched descriptors, unconventional combinations of functions and the like.

Certain aspects of descriptors which are germane will now be described. In general, each descriptor starts with a single byte defining the descriptor's length. A device descriptor may include the device class and USB specification version number. A configuration descriptor might include the interface descriptor and the total number of bytes in the configuration descriptors. The interface descriptor, if not in the configuration descriptors, includes alternative settings and classes. The string descriptor may include manufacturer, e.g., vendor or manufacturer identification (ID), product, e.g., product ID and other information strings, e.g., serial number. The descriptors provide sufficient information to at least allow a host system to select the proper driver for the USB device.

In addition, or alternatively, SCAI 318 may compare information about the new USB device with information stored in DID 316 or, if host system 300 has Internet connectivity, SCAI 318 may query a web resource (e.g., database) to determine if the new USB device has been identified as either safe or suspicious with a default condition of suspicious. DID 316 is preferably used to maintain a whitelist of approved USB devices, a blacklist of prohibited USB devices, or a combination of both. SCAI 318 may retrieve specific information about the USB device (e.g., manufacturer ID, product ID and/or other information) and compare such information to the whitelist and/or blacklist to determine if the device should be permitted to communicate with host system 300.

The above functions of the SCM 304 together with the SCAI 318 may be performed partly in the host 300 and the host's BIOS 130. The comparing of the new USB device's information to the listed information that precludes the USB device from communicating with the host could be part of the host's operating system 122 as would be understood by those skilled in the art.

In order to provide SCAI 318 with further information to consider in determining whether the new USB device should be permitted to communicate with host system 300, SCAI 318 may also include an application programming interface (API) 324 through which anti-virus applications, firewall applications or other applications may examine or test the new USB device or provide further information to be used in determining whether to allow the device to communicate (or to continue to communicate) with the host system. Thus, for example, if an anti-virus application detected a suspected virus on the new USB device, that information could cause SCAI 318 and SCM 304 to block communication until the virus was neutralized.

In addition, SCAI 318 may also receive information from a user through user configuration interface 320. Through interface 320, a user may direct various actions including selecting or changing a desired security level (e.g., low, medium or high) depending upon the user's environment or perceived risk level, identifying in advance preapproved or disapproved USB devices for addition to the whitelist or blacklist maintained in DID 316, saving a user's security settings and the like. A USB thumb drive (not shown) or other storage device could be used to both store a user's security settings, including a copy of DID 316, and provide a convenient mechanism for porting such information to an embedded system. By storing such information in a password protected, encrypted file, loss or theft of the thumb drive would not compromise security. In addition to serving as a storage and transport mechanism, the thumb drive could also is function as a dongle that must be physically attached to a given system in order for the system to operate. A user's security settings could also be stored in a secure website or network cloud, which would allow for easy retrieval for mobile users.

As discussed above, the contents of DID 316 may be updated in the field by any of a variety of techniques including host-initiated, automatic communication with a designated website, remote access to the host system by an authorized service provider, and user-initiated action.

Once a particular USB device 236 is cleared to communicate with host system 300, additional security arrangements may be applied. Specifically, once a particular USB device 236 begins communication with host system 300, run-time device identification module (DIM) 306 may monitor such communications for suspicious or unauthorized activity. Run-time DIM 306 may rely upon either static analysis functions 310 or heuristic analysis functions 312 (or both), as well as information from DID 316, in looking for suspicious activities. An example of a static analysis function is deep packet inspection in which the data, and possibly the commands, contained in packets originating from the USB device are examined for suspicious patterns. Similarly, packets originating from host system 300 and destined for one of USB devices 236 may be examined to determine if the data contained in the packets is appropriate for the USB device.

Another example of a static analysis function is applicable to a USB mass storage device. Run-time DIM 306 may store a hash of certain predetermined storage locations on the USB mass storage device using hash techniques known to those skilled in the art. During operation the USB mass storage device, run-time DIM 306 may monitor the device for suspicious changes in the hash and output an appropriate indication to ACM 308.

Another example of a static analysis function is applicable to suspicious activity identified with USB HID devices, such as a HID keyboard, connected to the USB host controller. For example, run-time DIM 306 may detect and reject pressing of the Windows® key of the keyboard, thereby defeating a variety of Windows®-R (nm) is attempts (attacks) that would run known programs to gain administrative access. Similarly, with respect to a HID mouse identified as suspicious, run-time DIM 306 may detect and reject left- or right-clicks which attempt to gain administrative access, including access to menus that run programs or allow unprotected access to host system 300.

An example of a heuristic analysis function is to monitor the rate of keystrokes originating from a USB device that has identified itself as a keyboard. If the keystroke rate exceeds a predetermined limit representing the maximum typing speed of a human, then that USB device would be flagged as suspicious by DIM 306 and an appropriate indication output to ACM 308. ACM 308 would then determine what action was warranted. In this example, an excessively high rate of keystrokes might indicate malicious activity (e.g., a denial of service type attack), but might also indicate that something has fallen on the keyboard or a key has stuck and the user has not noticed the problem.

Depending on the seriousness of the observed threat, ACM 308 could automatically block further communication from the suspicious USB device without user involvement, allow further communication but issue a threat notification via module 314, allow further communication but make a record of it, or take other action. Threat notification module 314, in turn, may present a human perceivable warning of the detected threat through user notification interface 322. In the case in which host system 300 is a PC or other system that includes an attached video display or television, the human perceivable warning may be in the form of a warning displayed as video. In the case in which host system 300 is an embedded system that does not include an attached video display, the human perceivable warning may be in the form of an audible warning, a flashing light or other display on a front panel of the system that is normally visible to a user, or the like. In cases where host system 300 includes Internet connectivity or PSTN connectivity, a warning in the form of email, text message or recorded announcement phone call could also be provided.

In accordance with yet another embodiment of the invention, at least part of the security arrangements described above may be provided in connection with a host system's BIOS functions. To guard against malicious activity originating from a USB device during the time period before the host system's operating system becomes active, the host system's BIOS 130 may be extended such that only a limited number of specifically defined, trusted USB devices will be recognized initially and allowed to operate. For example, the host system's 130 BIOS may be extended such that it initially recognizes only one keyboard and one mouse each of which is must be identified by a minimum number of descriptors. Once the operating system becomes active, a user could input information through user configuration interface 320 to identify a different keyboard or mouse which the BIOS should subsequently recognize.

Desired ones of the previously described security arrangements could also be provided through enhancements to the host controller. For example, by modifying the hardware or software (or both) of the host controller to perform desired security arrangements, improved performance in terms of speed may be achieved along with an increased resistance to tampering or malicious attempts to circumvent the arrangements.

The foregoing description has been directed to particular embodiments of this invention. It will be apparent, however, that other variations and modifications may be made to the described embodiments, with the attainment of some or all of their advantages. Specifically, it should be noted that embodiments of the present invention may be implemented in connection with various USB host systems and are not limited to host systems that rely on a particular operating system. Also, the procedures, processes and/or modules described herein may be implemented in hardware, software, embodied as a computer-readable medium having program instructions, firmware, or a combination thereof.

The invention claimed is:

1. A method for protecting a host system from a first device connected to the host system, the method comprising:
   executing an extended protocol stack having security arrangements at a processor of the host system,
   compiling a first list of devices that are not authorized to communicate with the host system, the first list of devices maintained by the security arrangements of the extended protocol stack;
   compiling a second list of suspicious descriptors maintained by the security arrangements of the extended protocol stack, wherein devices with those descriptors are not authorized to communicate with the host system;
   identifying the first device and its descriptors, wherein the first device is a first USB device;
   comparing the first list and the second list to the identified device and its descriptors and, if there is a match,
   preventing communications between the first device and the host system; and
   detecting suspicious activities between a second USB device and the system through static analysis and heuristic analysis, wherein the heuristic analysis includes monitoring a rate of keystrokes originating from a third USB device identified as a keyboard and, if the keystroke rate exceeds a predetermined limit representing a maximum typing speed, flagging the third USB device as suspicious.

2. The method of claim 1 further comprising:
   detecting suspicious activities of the first USB device connected with the host system; and
   in response to detecting the suspicious activities, preventing communication between the first USB device and the host system.

3. The method of claim 2 further comprising:
   compiling a whitelist of USB devices that are authorized to communicate with the host system; and
   if the first USB device is on the white list, allowing communications between the first USB device and the host system.

4. The method of claim 2 further comprising notifying a user that an unauthorized or suspicious USB device is connected to the host system.

5. The method of claim 2 wherein detecting suspicious activities comprises:
examining run time activities of the first USB device; and
in response to determining the activities are inconsistent with the first USB device, preventing communication between the first USB device and the host system.

6. The method of claim 5 wherein examining run time activities comprises:
examining data within packets originating from and destined to the first USB device; and
in response to determining that the data is inconsistent with the first USB device, preventing communication between the first USB device and the host system.

7. A system comprising:
a host controller;
a processor coupled to the host controller and adapted to execute an extended USB protocol stack having a security control module interfaced with a device identification database; and
a memory adapted to store the device identification database and the security control module to:
maintain a first list of USB devices that are not authorized to communicate with the host controller;
maintain a second list of USB devices having suspicious combinations of descriptors that are not authorized to communicate with the host controller;
maintain a third list of USB devices connected to the host controller that exhibit suspicious activities while communicating with the host controller;
block communication between a first USB device connected to the host controller and the system if there is a match between the first USB device and the first list, the second list or the third list; and
clear a second USB device to communicate with the system using a device identification module stored in the memory and adapted to detect suspicious activities between the second USB device and the system through static analysis and heuristic analysis, wherein the heuristic analysis includes monitoring a rate of keystroke originating from a third USB device identified as a keyboard and, if the keystroke rate exceeds a predetermined limit representing a maximum typing speed, flagging the third USB device as suspicious.

8. The system of claim 7 further comprising:
a security control application interface module stored in the memory and adapted to compare the first, the second and the third lists maintained by the device identification database with the first USB device and descriptors of the first USB device and, in response to a match, cooperating with the security control module to prevent communication between the first USB device and the system.

9. The system of claim 8 wherein the descriptors provide information to select a driver for the first USB device and wherein the descriptors include device descriptors, configuration descriptors, and string descriptors.

10. The system of claim 9 wherein the device descriptors include a device class and a USB specification version number.

11. The system of claim 9 wherein the configuration descriptors include an interface descriptor of alternative settings and classes, and a total number of bytes in the configuration descriptors.

12. The system of claim 9 wherein the string descriptors include a manufacturer identification (ID), a product ID, and a serial number.

13. The system of claim 7 wherein the static analysis includes deep packet inspection that examines data contained in packets originating from the second USB device and destined to the second USB device to determine if the data is appropriate for the second USB device.

14. The system of claim 7 further comprising:
a USB mass storage device connected to the host controller; and
wherein the device identification module is further adapted to store a hash of predetermined storage locations on the USB mass storage device.

15. The system of claim 14 wherein the static analysis includes monitoring the USB mass storage device for suspicious changes in the hash.

16. The system of claim 7 wherein the static analysis includes identifying suspicious activity of USB human interface devices (HIDs), and rejecting the suspicious activity to defeat an attempt to gain administrative access to the system.

17. The system of claim 16 wherein USB HIDs include a keyboard and a mouse, and wherein the suspicious activity includes pressing of a start key of the keyboard to run programs to gain administrative access to the system and detecting left- and/or right-clicks of the mouse to access menus that run programs or allow unprotected access to system.

18. A non-transitory computer-readable medium containing instructions, the instructions when executed by a processor operable to:
provide a universal serial bus (USB) protocol stack;
extend the USB protocol stack to include security modules adapted to protect a host system from unauthorized activity initiated by a USB device connected to the host system, the security modules including a security control module operating to enable communication between the host system and a USB device connected to the host system when the USB device is identified as authorized to communicate with the host system, the security control module further operating to disable communication between the host system and the USB device when the USB device is identified as not authorized to communicate with the host system, the security control module further operating to disable further communication between the host system and the USB device when the USB device is identified as initiating unauthorized activity with respect to the host system; and
clear a second USB device to communicate with the system using a device identification module stored in the memory and adapted to detect suspicious activities between the second USB device and the system through static analysis and heuristic analysis, wherein the heuristic analysis includes monitoring a rate of keystrokes originating from a third USB device identified as a keyboard and, if the keystroke rate exceeds a predetermined limit representing a maximum typing speed, flagging the third USB device as suspicious.

* * * * *

UNITED STATES PATENT AND TRADEMARK OFFICE
CERTIFICATE OF CORRECTION

| | | |
|---|---|---|
| PATENT NO. | : 8,713,683 B2 | Page 1 of 1 |
| APPLICATION NO. | : 13/637075 | |
| DATED | : April 29, 2014 | |
| INVENTOR(S) | : Terrill M. Moore et al. | |

It is certified that error appears in the above-identified patent and that said Letters Patent is hereby corrected as shown below:

In the Specification:
Col. 1, line 22 should read:
if not dominant, technology for interfacing personal com- Col. 2, line 31 should read:
database or other data structure which may be used to Col. 4, line 18 should read:
system 200 and enables communication between file sys- Col. 4, line 58 should read:
or modules, including the drivers and functions, described Col. 6, line 47 should read:
mechanism, the thumb drive could also function as a dongle Col. 7, line 19 should read:
ety of Windows®-R (run) attempts (attacks) that would run In the Claims:
Col. 9, line 43 should read:
ristic analysis includes monitoring a rate of keystrokes Signed and Sealed this
Twelfth Day of May, 2015

Michelle K. Lee
*Director of the United States Patent and Trademark Office*